United States Patent [19]
Curry, Jr.

[11] Patent Number: 5,214,777
[45] Date of Patent: May 25, 1993

[54] HIGH SPEED READ/MODIFY/WRITE MEMORY SYSTEM AND METHOD

[75] Inventor: James C. Curry, Jr., Lexington, S.C.

[73] Assignee: NCR Corporation, Dayton, Ohio

[21] Appl. No.: 328,642

[22] Filed: Mar. 27, 1989

[51] Int. Cl.$^5$ .................. G06F 12/00; G06F 12/08; G06F 13/00
[52] U.S. Cl. .................. 395/425; 364/DIG. 1; 364/243.41; 364/243.44; 365/189.01; 365/189.05
[58] Field of Search .......... 365/49, 230.01, 230.02, 365/221, 189.05, 189.01; 364/200 MS File, 900 MS File; 395/425

[56] References Cited
U.S. PATENT DOCUMENTS

| | | |
|---|---|---|
| 3,984,818 | 10/1976 | Gnadeberg et al. |
| 4,150,364 | 4/1979 | Baltzer . |
| 4,168,541 | 9/1979 | Dekarske .................. 365/200 |
| 4,315,312 | 1/1982 | Schmidt . |
| 4,439,829 | 3/1984 | Tsiang . |
| 4,467,443 | 8/1984 | Shima . |
| 4,527,238 | 7/1985 | Ryan et al. . |
| 4,577,293 | 3/1986 | Matick et al. .................. 365/49 |
| 4,942,520 | 7/1990 | Langendorf .................. 364/DIG. 1 |
| 5,008,813 | 4/1991 | Crane et al. .................. 364/DIG. 1 |
| 5,023,776 | 6/1991 | Gregor .................. 364/DIG. 1 |
| 5,097,414 | 3/1992 | Tone .................. 364/DIG. 1 |

Primary Examiner—Alyssa H. Bowler
Attorney, Agent, or Firm—Douglas S. Foote

[57] ABSTRACT

The subject invention is a an improved memory system and method for a data processing system. The method involves the overwriting of a first data word in a memory by a second data word, wherein each addressable location in the memory holds a data element with N data words. The method comprises reading the data element which includes the first data word from the memory into a first cache register, simultaneously writing the second data word to a second cache register, and then writing into the main memory the second data word along with all of the words of the data element in the first cache register save the first word.

18 Claims, 1 Drawing Sheet

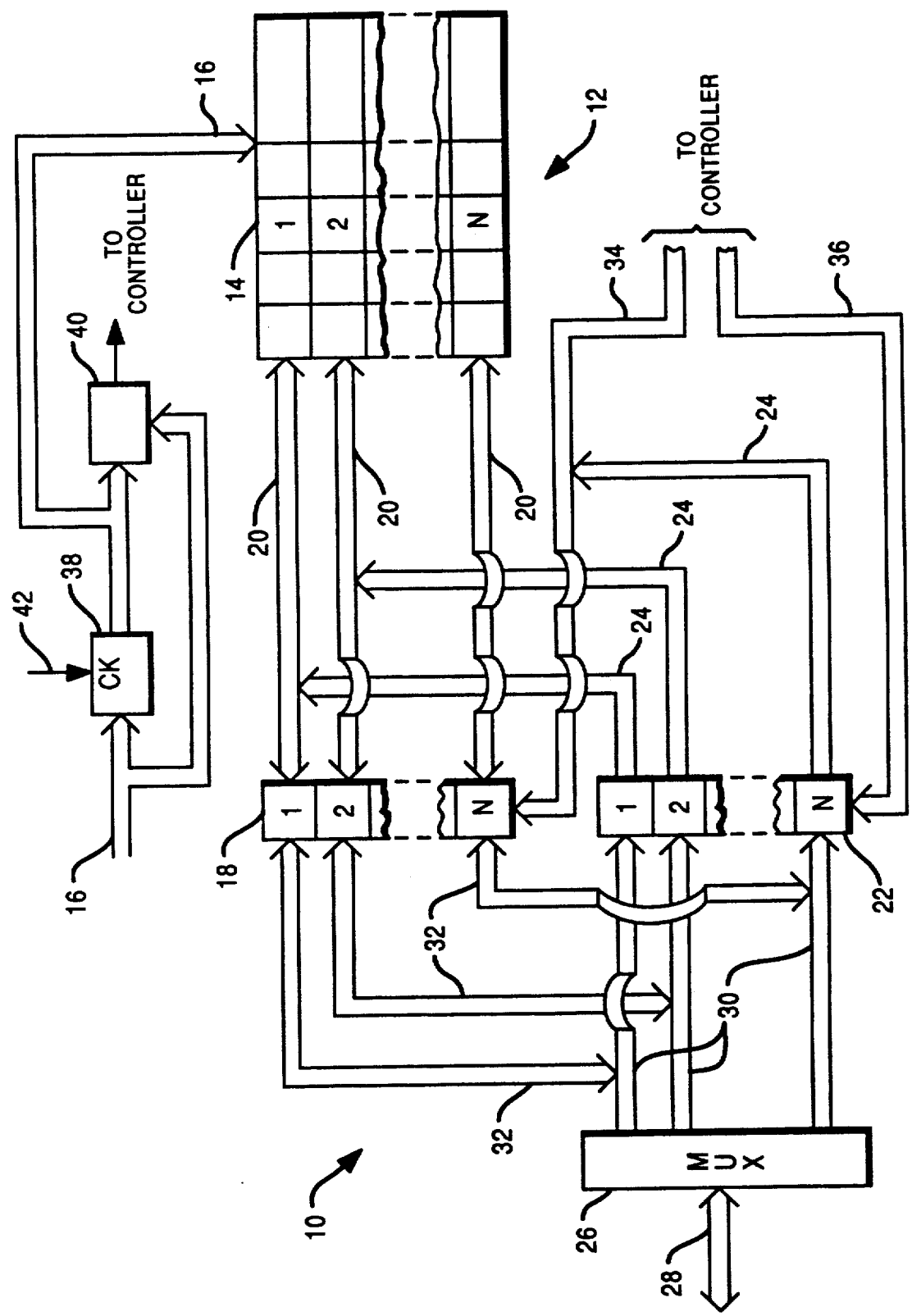

HIGH SPEED READ/MODIFY/WRITE MEMORY SYSTEM AND METHOD

The present invention relates to data processing systems. More particularly, it relates to memory systems with an addressable memory element size greater than the modifiable memory word size.

BACKGROUND OF THE INVENTION

Memories used in data processing systems are accessed for both read and write operations. Every data element stored in memory has a unique address associated therewith. The size or length of the addressable data element may vary from a single bit (bit addressable) to multiple bytes. In bit addressable memories, any single bit may be read from and/or written into the memory. However, for most memory systems one or more bytes are stored at each address and are accessed for each read/write operation.

Data elements accessed are not always of a length which is consistent with the performance of various other devices and operations within the data processing system. For example, data variables and data instructions may encompass several adjacent memory locations or, alternatively, may require fewer bits than in a full data element. Another example involves the accessing of a memory where the number of bits on a bus is less than the data element length. A data bus might be one byte (eight bits) wide, whereas the data element in the memory might be four bytes (thirty-two bits) wide.

For data memory systems where a word is to be overwritten into a memory having addressable data elements of more than a word, a read/modify/write operation is typically performed. Since the data word cannot be written directly into the memory, the data element having the proper address is first read into a register. The data element is then modified by overwriting the new word into the correct location within the data element. The modified data element is then written back into memory to complete the operation. The conventional read/modify/write operation has a problem which tends to slow down the operation and can have a negative impact on the overall performance of the data processing system. A read/modify/write operation requires three clock cycles, one cycle each to read, modify and write the data element into the memory. In contrast, a standard write operation to a memory, where the word to be written is the same, size as stored data elements within the memory, can be accomplished in one clock cycle.

OBJECTS OF THE INVENTION

It is therefore an object of the present invention to provide a new and improved memory system for a data processing system.

It is another object of the present invention to provide a new and improved read/modify/write memory system.

It is a further object of the present invention to provide a high speed read/modify/write memory system.

It is yet another object of the present invention to provide a new and improved method for overwriting a data word in a memory having addressable data elements of more than a word.

SUMMARY OF THE INVENTION

One form of the present invention is an improvement for a data processing system. The improvement comprises a memory for storing data elements, a first cache register connected to the memory, and a second cache register connected in parallel with the first cache register. Each data element has a unique address and includes N data words. The first register receives from the memory a single data element to be modified. The second register receives one or more data words to replace corresponding data words in the single data element. The improvement further comprises means for transferring to the memory the data words from the second cache register together with noncorresponding data words from the first cache register.

Another form of the present invention is a method for overwriting a first data word in a memory by a second data word, wherein each addressable location in the memory holds a data element with N data words. The method comprises reading the data element which includes the first data word from the memory into a first cache register, simultaneously writing the second data word to a second cache register, and then writing into the main memory the second data word along with all of the words of the data element in the first cache register save the first word.

BRIEF DESCRIPTION OF THE DRAWINGS

The FIGURE is a schematic drawing of a high speed read/modify/write system according to one form of the present invention.

DESCRIPTION OF A PREFERRED EMBODIMENT

The FIGURE shows a memory system 10 for a data processing system. A memory 12 stores data elements 14. For purposes of the invention, memory 12 could be a cache memory or slower main memory. Each data element 14 has a unique address and consists of N data words. The term "data word" as used herein is intended to encompass one or more data bits, the number of bits in the word being less than the number of bits in a data element. Addressing of a specific data element 14 in memory 12 is provided by means of address bus 16.

A cache register 18 for holding a single data element 14 is connected to memory 12 by N conduction lines 20. Cache register 18 has N storage cells, labeled 1, 2, ..., N. Each cell stores respective words of a data element 14. Each cell in register 18 has a location therein which corresponds to the relative position of data words of element 14 as stored in memory 12. Restated, there is a one-to-one correspondence between data words 1, 2, ..., N of each data element 14 stored in memory 12 and data cells 1, 2, ..., N in cache register 18. The number of physical conductors in each line 20 depends on the number of bits in each data word of data element 14. For example, if each word consists of just one bit, each conduction line 20 will include one conductor. If each word consists of one byte (eight bits), each conduction line 20 will have at least eight conductors.

A cache register 22 is connected in parallel with register 18. Cache register 22 has N storage cells, labeled 1, 2, ..., N, for storing data words. Each cell corresponds to a respective cell in register 18. N conduction lines 24 connect register 22 with respective ones of conduction lines 20. Each conduction line 24 will have the same number of physical conductors as respective conduction lines 20. In a preferred embodiment, each storage cell in registers 18 and 22 include the same number of data bits.

A multiplexer 26 conveys data words to and from memory 12. Multiplexer 26 is located between a data bus 28 and cache registers 18 and 22. N conduction lines 30 connect multiplexer 26 with register 22. Another N conduction lines 32 connect register 18 with respective ones of conduction lines 30. Each conduction line 30 and 32 will have enough conductors to handle the number of data bits in a data word. Although the invention will work with a data bus 28 of any number of conductors, it is particularly adapted in a preferred embodiment to work with a data bus 28 of a single data word wide.

Control lines 34 and 36 are connected to each register 18 and 22, respectively. These will carry control signals to enable the output of specific cells in each register by selecting and activating conduction lines. Each cell in cache register 22 includes a flag bit which indicates the presence of a data word in that particular cell. As will be discussed more fully hereinafter, control line 36 responds to the presence of a flag bit to enable the output of that cell. Control line 34 responds to the presence of flag bits in register 22 by enabling the output of the noncorresponding cells in register 18.

In order to keep track of the address of the data element in register 18, a latch 38 and comparator 40 are provided. Latch 38 is connected between address bus 16 and memory 12. In a preferred embodiment latch 38 includes a plurality of clocked flip-flops, one for each line in address bus 16. A control signal, for clocking in an address on bus 16, is received at the CK inputs to the flip-flops from a control line 42. Comparator 40 receives the address stored in latch 38 and the address on bus 16 and provides an output control signal indicating whether or not there is a correspondence between the addresses.

In operation, the subject invention allows individual data words in memory 12 to be overwritten with data words received from data bus 28 with minimum delays. In brief, when a data word (hereinafter referred to as the second data word) is to be written into memory 12, the data element 14 which includes the data word to be overwritten (hereinafter referred to as the first data word) is read from memory 12 into cache register 18. At the same time, the second data word is written from data bus 28 into cache register 22. The second data word will be directed to the cell in register 22 that corresponds to the cell in register 18 receiving the first data word. By simultaneously reading data element 14 into register 18 with the writing of the second data word into register 22, the "read latency" inherent in prior art read/modify/write memory systems is eliminated. A single write operation to memory 12 may then be performed by writing the second data word from register 22 along with all of the words of the data element in register 18 save the first data word. In other words, the data element is modified by the substitution of one data word for another.

Consecutive data words written into memory 12 are frequently located at adjacent memory locations. For example, if a second data word is to overwrite data word 1 in data element 14, it is likely that the next data word will overwrite data word 2 in element 14. Thus, according to one form of the present invention, the data element in register 18 with replacement data word in register 22 is not immediately written back to memory 12 after the second data word is written into register 22. Rather, the system must wait until a next data word is to be written into memory 12. At such time, cache register 18 is first checked for the presence of the data element to be modified. More specifically, register 18 is checked for the data element having a first data word corresponding to (having the same address as) the next data word. Data register 18 is checked by means of comparator 40. When the address of the next data word to be written into memory 12 is placed on address bus 16, it is compared with the address stored in latch 38 (the address of the data element currently in register 18). If it is determined that the desired data element is already in register 18 by the indication of a "hit", a control signal on line 36 will be sent to register 22 to enable the next data word to be written into register 22. For each succeeding word to be written to memory, register 18 is first checked by means of comparator 40 to determine the presence of the data element to be modified. Since it frequently happens that sequentially presented data words will be stored in adjacent locations in memory, many write and read operations with respect to memory 12 are thereby eliminated.

Comparator 40 will indicate when the address on bus 16 and in latch 38 are not the same. At such time, since the correct data element is not in register 18, any second data words in register 22 must now be written into memory 12. As noted previously, each cell in register 22 has a flag bit associated therewith which is set when a word is written to it. These flag bits are checked, and the corresponding conduction line 24 is enabled for any cell having such a flag. At the same time the conduction lines 20 for the noncorresponding words in register 18 are enabled. In this manner the data element in register 18 is written back into memory 12 save for the overwriting of second data words. Cache register 22 is reset after the write operation to prepare it for receiving the next data word.

As soon as any second data words in register 22 have been written to memory 12, latch 38 is enabled to store therein the address which is on bus 16. Memory 12 is then addressed and the data element having the correct data word corresponding to the next data word to be written into memory 12 is transferred to register 18. Simultaneously therewith the next second data word is written into register 22. The process can be repeated for subsequently presented second data words. As long as register 18 contains the correct data element, the second data word is written directly into register 22. When the correct data element is not in register 18, the contents of register 22 together with noncorresponding words in register 18 are written to memory 12 and the correct data element is fetched.

The subject invention is also adapted to allow read operations from memory 12 to occur. As with the previously described read/modify/write operation, cache register 18 is first checked by means of comparator 40 for the presence of the data element to be read. If the data element is there, registers 18 and 22 are simultaneously read, with flag bits in register 22 indicating those conduction lines 30 and 32 to be enabled. If the data element is not in register 18, a register flush must occur with data words in register 22 and noncorresponding words in register 18 being written to memory 12. This write will be followed by a memory read with the data element being latched by register 18 on its way to data bus 28.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. An improvement for a data processing system comprising:
   a memory for storing data elements, each element having a unique address and including N data words;
   a first cache register connected to said memory for receiving from said memory a single data element to be modified;
   a second cache register connected in parallel with said first cache register for receiving one or more data words to replace corresponding data words in said single data element; and
   means for transferring to said memory said data words from said second cache register together with noncorresponding data words from said first cache register.

2. The improvement of claim 1 wherein said first cache register has N storage cells, each cell storing respective words of a data element.

3. The improvement of claim 2 wherein said second cache register has N storage cells, each cell corresponding to a respective cell in said first cache register and capable of storing a replacement word.

4. The improvement of claim 3 wherein each cell in said second cache register includes a flag bit for identifying the presence of a data word.

5. The improvement of claim 4 further comprising a plurality of first conduction lines connecting said memory with said first cache register and a plurality of second conduction lines connecting said second cache register with respective ones of said first lines.

6. The improvement of claim 5 wherein said transferring means includes means for selecting and activating second conduction lines corresponding to set flag bits and activating noncorresponding first conduction lines.

7. The improvement of claim 3 wherein each of said storage cells in said first and second cache registers includes the same number of data bits.

8. The improvement of claim 1 further comprising a plurality of third conduction lines connecting said second cache register with a data bus of said data processing system.

9. The improvement of claim 8 further comprising a plurality of fourth conduction lines connecting said first cache register with respective ones of said third conduction lines.

10. The improvement of claim 8 wherein said data bus is a single data word wide.

11. The improvement of claim 9 further comprising a multiplexer between said data bus and said third conduction lines.

12. An improvement for a data processing system comprising:
   a memory for storing data elements, each element having a unique address and including N data words;
   a first cache register connected to said memory for receiving from said memory a single data element to be modified, wherein said first cache register has N storage cells, each cell storing respective words of a data element;
   a second cache register connected in parallel with said first cache register for receiving one or more data words to replace corresponding data words in said single data element, wherein said second cache register has N storage cells, each cell corresponding to a respective cell in said first cache register, capable of storing a replacement word, and including a flag bit for identifying the presence of a data word;
   means for transferring to said memory said data words from said second cache register together with noncorresponding data words from said first cache register;
   a plurality of first conduction lines connecting said memory with said first cache register and a plurality of second conduction lines connecting said second cache register with respective ones of said first lines, said transferring means including means for selecting and activating second conduction lines corresponding to set flag bits and activating noncorresponding first conduction lines;
   a plurality of third conduction lines connecting said second cache register with a data bus of said data processing system; and
   a plurality of fourth conduction lines connecting said first cache register with respective ones of said third conduction lines.

13. The improvement of claim 9 wherein said data bus is a single data word wide and further comprising:
   a multiplexer between said data bus and said third conduction lines.

14. A method for overwriting a first data word in a memory by a second data word, wherein each addressable location in said memory holds a data element with N data words, comprising:
   a. reading the data element which includes said first data word from said memory into a first cache register;
   b. simultaneously writing said second data word to a second cache register; and
   c. writing into said main memory said second data word along with all of the words of said data element in said first cache register save said first word.

15. The method of claim 14 further comprising:
   d. simultaneously with steps a and b, setting a flag bit in said second cache register associated with said second data word.

16. A method for overwriting discrete first data words in a memory by sequentially presented corresponding second data words, wherein each addressable location in said memory holds a data element with N data words, comprising:
   a. addressing the memory location of a second data word to be written into said memory;
   b. transferring the data element which includes the corresponding first data word to be overwritten from said memory into a first cache register;
   c. writing said second data word to a second cache register simultaneously with step b.;
   d. checking said first cache register for the data element corresponding to the next second data word to be written into said memory;
   e. writing said next data word to said second cache register, if the data element is in said first cache register;

f. repeating steps e and f until the data element is not in said first cache register; and g. writing into said main memory all second data words in said second cache register along with all of the noncorresponding first data words in said first cache register.

17. A method for overwriting discrete first data words in a memory by sequentially presented corresponding second data words, wherein each addressable location in said memory holds a data element with N data words, comprising:

a. checking a first cache register for the data element including the corresponding first data word to a second data word to be written into said memory;

b. if the data element is in said first cache register, writing said second data word to a second cache register, but if the data element is not in said first cache register, going to step d;

c. repeating steps a and b;

d. checking said second register for the presence of second data words;

e. if said second data register contains second words, writing into said main memory all second data words in said second cache register along with all of the noncorresponding words in said first cache register, but if said second data register does not contain second words, going to step g;

f. resetting said second cache register;

g. transferring the data element which includes the corresponding first data word from said memory into said first cache register; and h. writing said second data word to said second cache register simultaneously with step g.

18. The method of claim 17 further comprising: repeating steps a through e.

* * * * *